Patented May 4, 1954

2,677,636

UNITED STATES PATENT OFFICE 2,677,636

METHOD OF PLANT THERAPY AND COMPOSITION OF MATTER USEFUL THEREIN

Frank L. Howard, Kingston, Nestor E. Caroselli, Providence, and Albert W. Feldman, Saunderstown, R. I.; said Caroselli assignor to F. A. Bartlett Tree Expert Company, Stamford, Conn., a corporation of Connecticut; said Howard and said Feldman assignors to The Board of Trustees of Rhode Island State Colleges, Providence, R. I., a corporation of Rhode Island No Drawing. Application July 2, 1949,
Serial No. 102,943

16 Claims. (Cl. 167—14)

This invention relates to a method of inhibiting systemic vascular wilt diseases caused by toxins in trees, shrubs and herbaceous plants, and to a composition of matter useful therein. While the invention is here disclosed primarily in its application to the control of the so-called Dutch elm disease in elm trees, it is not specifically limited to the treatment of that disease, nor to diseases of trees, but is of broader application as indicated.

Two of the present inventors have heretofore pointed out (Patent No. 2,334,556, granted November 16, 1943) that the pathogenic fungus *Phytophthora cactorum* produces a toxin which will travel through the conducting tissue of certain trees, particularly sycamore, Norway maples and beeches, producing the disease known as "bleeding canker"; and that the pathological condition of such trees may be treated by introducing into the conducting tissues, according to the technique disclosed in said patent, a dilute solution of a hydrochloride salt of azobenzene containing an NH₂ group, as therein more specifically described. The present invention is directed to the treatment not only of the fungus above-mentioned, but also the treatment of other fungi, particularly *Ceratostomella ulmi*, the cause of Dutch elm disease, *Fusarium lycopersici*, the cause of solanaceous plant wilts, and Verticillium spp. and Rhizoctonia spp., the cause of certain other wilts. Our laboratory studies on the physiology of these pathogenes indicate that they produce a toxin, and these studies have led to the development of methods for standardizing toxin production, perfecting rapid bioassay techniques to evaluate therapeutants, determining factors responsible for toxin formation, and learning something about the complex nature of the toxic principle. "Toxin," as here used, includes the direct and/or indirect metabolic products, resulting from the action of a microorganism on or in a living or dead substrate, which exert a deleterious effect on plant tissues or affect the basic physiology of the host so that an abnormal physiological response occurs.

We have produced the toxin of *C. ulmi* in the laboratory by growing the pathogenic fungus in liquid synthetic media adjusted to pH 4.25 with citrate buffer. Greatest yields are obtained when 50 ml. of the inoculated medium contained in 250 ml. flasks are supported on a constantly shaking "table" for 7 days at about 26° C. Synthetic media optimum for toxin production contain glucose as the carbon source, l-asparagine for nitrogen, yeast extract for B-vitamin complex, citric acid for buffering, and other basic essential ions. The amount of toxin resulting from the metabolism of the fungus is a direct function of the pH of the medium. Assays have shown that up to 500 times more toxin is produced at a pH of 4.25 than when the medium is adjusted to pH 7.0 with citric acid-sodium hydroxide. Furthermore, there is an irreversible inactivation of the toxin by hydroxyl ions irrespective of the associated cation.

Quantitative determination of the titre of toxins has been obtained by measuring their effect upon the rate of protoplasmic streaming, the respiration of various host tissues by manometric methods, and the wilting of various species of seedlings grown under standardized conditions. The last has proved most satisfactory from the standpoint of simplicity and rapidity of action and permits the screening of a large number of toxin-inactivating chemicals at a series of dosages. This allows evaluation of the concentration necessary for toxin inactivation as well as phytotoxicity of the chemical.

For illustration, we here disclose our invention in connection with the treatment of elm trees for the Dutch elm disease caused by *C. ulmi*. Our observations have been validated by studies upon potted elm seedlings grown under glasshouse and open air conditions, and by practical field demonstration on many large elm trees growing on private estates in New York, Pennsylvania, Connecticut and Massachusetts where damage from the Dutch elm disease has been most severe. Many of the trees used in field tests had trunk diameters ranging from 30" to 60" and were growing in soils ranging from pH 4.2 to 5.4.

In the majority of these tests, both on potted elm seedlings and on large trees in the field, the therapeutant which is the subject of the present invention was applied in water dispersion as an impregnant in the soil in which the seedling or tree was growing. The form of the invention described and claimed herein is primarily of value in soil impregnation, but beneficial results have also been obtained when using a method (which is the subject of a separate application filed contemporaneously herewith) involving direct trunk injection according to the technique disclosed in Patent No. 2,334,556, and also to some extent when the therapeutant suitably diluted in water is sprayed upon the leaves. Since our composition of matter—i. e., the therapeutant itself— differs in its composition depending upon the intended mode of application to the tree, the composition described and claimed in this application is primarily that which is adapted to soil impregnation.

According to one form of the present invention, the hereinafter specified composition of matter may be broadcast on the surface of the soil under the tree in an amount depending upon soil acidity which is sufficient to bring the pH of soil to 7.0 or above. For example, therapeutant at the rate of 20 lbs. per trunk diameter inch at breast height may be spread on the roughly circular area of soil having its center at the trunk and a radius which is 10 ft. greater than the spread of the branches. Thereafter heavy watering is relied on to carry the therapeutant into the soil where it can be taken up by the roots. According to another form of the invention, our composition, dissolved or suspended in water at the rate of about 1 lb. per gallon, may be forced under high pressure into the soil around the tree within the general area just mentioned, so that the soil in the neighborhood of the roots becomes thoroughly impregnated with the solution.

The therapeutant which is used according to the present invention consists mainly of lime or hydrated lime, as a base material, to which has been added, in the quantities and proportions set forth, the ingredient described in paragraph (a) below, either with or without one or more of the ingredients mentioned in paragraphs (b), (c) and (d) as described and claimed below.

Hydrated lime ($Ca(OH)_2$) is the preferred base material. As commercially available, hydrated lime often contains a substantial proportion of other materials such as magnesium hydroxide sometimes running as high as 40 or 50%. Commercial grades of hydrated lime are graded and sold according to their "CaO equivalent" and for the purposes of the present invention those forms of hydrated lime which have a "CaO equivalent" of at least 70% are preferred. Ordinary lime (CaO) may also be used as the base material in the present invention, but it is somewhat slower acting. Where the expression "lime" is used in this specification and in the subjoined claims it will be understood to include both lime and hydrated lime as hereinabove set forth.

The chemicals which, according to the present invention, are added to the lime in one or more combinations as hereinafter described and claimed, are as follows:

(a) *Salicylic acid or the sodium, potassium or calcium salts of salicylic acid.*—Salicylic acid may be mixed with lime (either with or without one or more of the other chemicals mentioned below) in an amount such that the total amount of acid does not exceed approximately 1.5% by weight of the therapeutant. The above-named salts of salicylic acid may be substituted in place of the acid, under like circumstances, up to an amount which, computed on an acid equivalent basis, is not substantially in excess of the top limit named for the acid. In the case of the sodium salt this is approximately 1.75% by weight; in the case of the potassium and calcium salts it is approximately 2% by weight. Too much acid or salt will cause foliage and root necrosis, when our composition is impregnated in the soil within the root area. The permissible top limit of acid or salt which may be contained in our composition is that amount which will not cause foliage burning. In general, this limit is at or approximately at the percentages above-stated. The lower limit of the acid is that at which its beneficial effects substantially disappear. According to our experiments this is at approximately 0.3% by weight in the case of the acid and at the same figure when the salts are computed on an acid equivalent basis (which works out about 0.5% by weight in the case of each of the named salts). The function of salicylic acid and its named salts, when combined with lime as herein described, appears to be that of neutralizing the toxin of *C. ulmi* in a special manner which produces a slow and long-lasting effect.

(b) *Urea.*—The urea may be used in a relatively pure condition, in which case it contains about 46% nitrogen. It may also be used in one of the forms, containing somewhat less nitrogen, in which it is commercially available. We have used a product sold commercially under the name "Uramon" which appears to contain about 42% nitrogen, the urea in this case being mixed with inert coco shell meal to keep it in good condition. If too much urea is used in carrying out our invention, it causes necrosis of young tree cells. Accordingly, the upper limit of urea which may be used in our composition is that which will avoid burning of young growth, and (on a pure urea basis) this is approximately 2% by weight of the therapeutant. The lower limit of urea which will produce useful effects in our invention is approximately 0.5% by weight. The function of urea is to serve as a quick-acting neutralizing agent for the toxin and also as a metabolite for the plant.

(c) *Sugar in the form of sucrose or dextrose.*—We prefer to use ordinary cane sugar (sucrose) because of its cheapness. If too much sugar is used in our composition, it causes injury to the roots of the tree. While the upper limit is somewhat indefinite, and cannot be stated with exactness, our experiments indicate that where our composition contains substantially more than 10% of sugar, the danger of root injury begins to appear. The function of sugar is to serve as a metabolite to stimulate plant cellular activity.

(d) *Sodium nitrite.*—The permissible upper limit of sodium nitrite which may be contained in our composition of matter is that amount which will just fail to cause leaf browning and killing of the plant. This upper limit is rather sharply defined at or about 1.5% by weight of the therapeutant. The function of the sodium nitrite is both to neutralize the toxin and to serve as a metabolite.

One or more of the ingredients named in paragraphs (a), (b), (c) and (d) may be added, within the quantity limitations hereinabove set forth, to a composition of matter consisting chiefly of lime or hydrated lime (with or without inert ingredients, as hereinabove mentioned) as set forth in the following examples:

*Example 1*

|  | Pounds |
|---|---|
| Hydrated lime (70% CaO equivalent) | 99.5 |
| Salicylic acid | 0.5 |

This formulation was applied at the rate of 20 lbs. for each inch of trunk diameter at breast height to 10 elm trees by sprinkling the formulation on the soil in the root area, and then watering heavily. These trees were inoculated, one week after treatment, with *C. ulmi*. Other elm trees, to which the formulation had not been applied and growing in the same soil conditions, were similarly inoculated with *C. ulmi*. All of the last mentioned group of trees were found to be dead or dying within three weeks after inoculation with the pathogen. Of the treated trees 40% failed to show symptoms of the disease during the remainder of the growing season. In a similar series of tests, where the inoculation with *C. ulmi* took place one week before treatment, the control was approximately 30%.

The foregoing tests were repeated with the formulation dissolved or suspended in water at the rate of about a pound per gallon, and this solution was injected into the soil under heavy pressure throughout the root area. In these tests the control achieved was 50% where *C. ulmi* inoculation was one week after treatment, and 40% where inoculation was one week before treatment.

*Example 2*

| | Pounds |
|---|---|
| Hydrated lime (70% CaO equivalent) | 98.8 |
| Salicylic acid | 0.5 |
| Urea | 1.7 |

This formulation scattered on the ground in the treatment of 10 trees, with subsequent heavy watering, achieved 50% control where the trees were inoculated one week after treatment, and 40% control where the trees were inoculated one week before treatment.

*Example 3*

| | Pounds |
|---|---|
| Hydrated lime (70% CaO equivalent) | 94.5 |
| Salicylic acid | 0.5 |
| Sugar | 5.0 |

This formulation dispersed in water at the rate of 100 lbs. per 100 gallons was injected into the soil under heavy pressure near the base of twenty large elm trees. Symptom development was inhibited in 60% of those trees, which were inoculated with *C. ulmi* one week after treatment, and 40% of those trees which were inoculated one week before treatment.

*Example 4*

| | Pounds |
|---|---|
| Hydrated lime (70% CaO equivalent) | 99.0 |
| Salicylic acid | 0.5 |
| Sodium nitrite | 0.5 |

This formulation was applied to a group of 20" diameter trees. Symptom development was inhibited in 80% of the trees where inoculation with the disease was one week after treatment, and 60% where inoculation was one week before treatment.

*Example 5*

| | Pounds |
|---|---|
| Hydrated lime (70% CaO equivalent) | 92.8 |
| Salicylic acid | 0.5 |
| Urea | 1.7 |
| Sugar | 5.0 |

The above formulation was used in treating a series of large elm trees and resulted in 80% control where the trees were inoculated one week after treatment and 60% where they were inoculated one week before treatment.

*Example 6*

| | Pounds |
|---|---|
| Hydrated lime (70% CaO equivalent) | 94.0 |
| Salicylic acid | 0.5 |
| Sodium nitrite | 0.5 |
| Sugar | 5.0 |

The above formulation applied to a series of large trees resulted in 80% control where the trees were inoculated one week after treatment and 50% where they were inoculated one week before treatment.

We use the word "sub-phytocidal" in the subjoined claims to indicate an amount or concentration of one or more of the chemicals mentioned in paragraphs (a), (b), (c) and (d) above below that which will cause burning of the foliage tips or of young growth, root injury, leaf browning or killing of tree tissue, or will be otherwise seriously detrimental to the living tissue of the tree. We have set forth hereinabove, as a percentage of weight in our composition, the approximate upper limits for each of these chemicals respectively, but it will be understood that these upper limits cannot be stated more precisely since they are somewhat approximate in nature, as stated in more detail in paragraphs (a), (b), (c) and (d). It will be further understood that when our composition is applied to the soil it is important that sufficient water be used so that the concentration of these chemicals reaching the roots is reduced to or below that level of concentration which we call "subphytocidal."

We have used the expression "control" to mean that symptom development is largely or substantially inhibited over a prolonged period of time, in most cases several weeks or months, to indicate that a pronounced beneficial effect has been achieved. We do not claim for our invention that it will, in all cases, achieve an absolute or final "cure" of the Dutch elm disease in every tree to which it is applied. Disease which is already far advanced, especially in trees where a large percentage of the foliage and branches are already seriously affected, apparently cannot be controlled through the use of our invention, though some benefits appear in almost every case. Our invention appears to be chiefly beneficial in the case of trees which have been recently infected, or in which the progress of the disease has not yet become far advanced. For example, soil injection under hydraulic pressure of a solution or suspension as described in Example 2 adjacent the roots of a series of elms whose trunk diameters ranged from 30 to 60 inches, and whose tops were from 5 to 80% dead from Dutch elm disease, indicated that within a week further progress of the disease was stopped in 60% of the trees, and where not more than 10% of the tree was affected at the time of treatment, about 90% appear to have recovered.

We do not intend that our invention shall be limited to the specific examples of method or composition set forth above, which are merely for purposes of illustrating the best ways known to us of carrying out the invention, but that the same shall be taken and construed as set forth in the subjoined claims.

We claim:

1. The method of inhibiting systemic vascular wilt diseases caused by toxins in plants which comprises impregnating the earth adjacent the roots of the plant to bring the pH of the earth to at least approximately 7.0 with a composition of matter containing, by weight, a toxin neutralizing amount up to approximately 1.5%, calculated on an acid equivalent basis, of a substance selected from the group consisting of salicylic acid and the sodium, potassium and calcium salts of salicylic acid, and at least about 92.8% of lime.

2. The method of inhibiting systemic vascular wilt diseases caused by toxins in plants which comprises impregnating the earth adjacent the roots of the plant to bring the pH of the earth to at least approximately 7.0 with a composition of matter consisting, by weight, of a toxin neutralizing amount up to approximately 1.5%, calculated on an acid equivalent basis, of a substance selected from the group comprising salicylic acid and the sodium, potassium and calcium salts of salicylic acid, and the balance substantially all lime.

3. The method of inhibiting systemic vascular wilt diseases caused by toxins in plants which comprises impregnating the earth adjacent the roots of the plant to bring the pH of the earth to at least approximately 7.0 with a composition of matter consisting, by weight, of a toxin neutralizing amount up to approximately 1.5%, calculated on an acid equivalent basis, of a substance selected from the group consisting of salicylic acid and the sodium, potassium and calcium salts of salicylic acid, about 0.5% to 2% of urea, and the balance substantially all lime.

4. The method of inhibiting systemic vascular wilt diseases caused by toxins in plants which comprises impregnating the earth adjacent the roots of the plant to bring the pH of the earth to at least approximately 7.0 with a composition of matter consisting by weight of a toxin neutralizing amount up to approximately 1.5%, calculated on an acid equivalent basis, of a substance selected from the group consisting of salicylic acid and the sodium, potassium and calcium salts of salicylic acid, sugar up to about 10%, and the balance substantially all lime.

5. The method of inhibiting systemic vascular wilt diseases caused by toxins in plants which comprises impregnating the earth adjacent the roots of the plant to bring the pH of the earth to at least approximately 7.0 with a composition of matter containing by weight a toxin neutralizing amount up to about 1.5%, calculated on an acid equivalent basis, of a substance selected from the group consisting of salicyclic acid and the sodium, potassium and calcium salts of salicylic acid, sodium nitrite up to about 1.5%, and at least about 94% of lime.

6. The method of inhibiting systemic vascular wilt diseases caused by toxins in plants which comprises impregnating the earth adjacent the roots of the plant to bring the pH of the earth to at least approximately 7.0 with a composition of matter consisting, by weight, of a toxin neutralizing amount up to approximately 1.5%, calculated on an acid equivalent basis, of a substance selected from the group comprising salicylic acid and the sodium, potassium and calcium salts of salicylic acid, sodium nitrite up to about 1.5%, and the balance substantially all lime.

7. The method of inhibiting systemic vascular wilt diseases caused by toxins in plants which comprises impregnating the earth adjacent the roots of the plant to bring the pH of the earth to at least approximately 7.0 with a composition of matter consisting, by weight, of a toxin neutralizing amount up to approximately 1.5%, calculated on an acid equivalent basis, of a substance selected from the group comprising salicylic acid and the sodium, potassium and calcium salts of salicylic acid, sugar up to about 10%, sodium nitrite up to about 1.5%, and the balance substantially all lime.

8. The method of inhibiting systemic vascular wilt diseases caused by toxins in plants which comprises impregnating the earth adjacent the roots of the plant to bring the pH of the earth to at least approximately 7.0 with a composition of matter consisting by weight of a toxin neutralizing amount up to approximately 1.5%, calculated on an acid equivalent basis, of a substance selected from the group consisting of salicylic acid and the sodium, potassium and calcium salts of salicylic acid, about 0.5% to 2% of urea, sugar up to about 10%, and the balance substantially all lime.

9. A composition of matter for inhibiting systemic vascular wilt diseases caused by toxins in plants containing by weight a toxin neutralizing amount up to approximately 1.5%, calculated on an acid equivalent basis, of a substance selected from the group consisting of salicylic acid and the sodium, potassium and calcium salts of salicylic acid, and at least about 92.8% of lime.

10. A composition of matter for inhibiting systemic vascular wilt diseases caused by toxins in plants consisting by weight of a toxin-neutralizing amount up to approximately 1.5%, calculated on an acid equivalent basis, of a substance selected from the group comprising salicylic acid and the sodium, potassium and calcium salts of salicylic acid, and the balance substantially all lime.

11. A composition of matter for inhibiting systemic vascular wilt diseases caused by toxins in plants consisting by weight of a toxin neutralizing amount up to approximately 1.5%, calculated on an acid equivalent basis, of a substance selected from the group consisting of salicylic acid and the sodium, potassium and calcium salts of salicylic acid, approximately 0.5% to 2% of urea, and the balance substantially all lime.

12. A composition of matter for inhibiting systemic vascular wilt diseases caused by toxins in plants consisting by weight of a toxin neutralizing amount up to approximately 1.5%, calculated on an acid equivalent basis, of a substance selected from the group consisting of salicylic acid and the sodium, potassium and calcium salts of salicylic acid, sugar up to about 10%, and the balance substantially all lime.

13. A composition of matter for inhibiting systemic vascular wilt diseases caused by toxins in plants containing by weight a toxin neutralizing amount up to approximately 1.5%, calculated on an acid equivalent basis, of a substance selected from the group consisting of salicylic acid and the sodium, potassium and calcium salts of salicylic acid, sodium nitrite up to about 1.5%, and at least about 94% lime.

14. A composition of matter for inhibiting systemic vascular wilt diseases caused by toxins in plants consisting by weight of a toxin neutralizing amount up to approximately 1.5%, calculated on an acid equivalent basis, of a substance selected from the group comprising salicylic acid and the sodium, potassium and calcium salts of salicylic acid, sodium nitrite up to about 1.5%, and the balance substantially all lime.

15. A composition of matter for inhibiting systemic vascular wilt diseases caused by toxins in plants consisting by weight of a toxin neutralizing amount up to approximately 1.5%, calculated on an acid equivalent basis, of a substance selected from the group comprising salicylic acid and the sodium, potassium and calcium salts of salicylic acid, sugar up to about 10%, sodium nitrite up to about 1.5%, and the balance substantially all lime.

16. A composition of matter for inhibiting systemic vascular wilt diseases caused by toxins in plants consisting by weight of a toxin neutralizing amount up to approximately 1.5%, calculated on an acid equivalent basis, of a substance selected from the group consisting of salicylic acid and the sodium, potassium and calcium salts of salicylic acid, about 0.5% to 2% of urea, sugar up to about 10%, and the balance substantially all lime.

References Cited in the file of this patent

UNITED STATES PATENTS

| Number | Name | Date |
|---|---|---|
| 1,950,068 | Spangenberg | Mar. 6, 1934 |

FOREIGN PATENTS

| Number | Country | Date |
|---|---|---|
| 237,256 | Great Britain | June 10, 1926 |

OTHER REFERENCES

Horsfall et al., Phytopathology, volume 32 (1), page 22, January 1942.

Chemiker Zeitung, volume 20 (1896), pages 344 and 345.

University of California, College of Agriculture, Agr. Exp. St., Berkeley, California, Circular No. 321 (March 1931), 12 pages.

Proc. Amer. Soc. for Horticultural Science, volume 30 (1933), pages 70 to 86.